United States Patent [19]

Arvanitakis

[11] Patent Number: 4,608,169

[45] Date of Patent: Aug. 26, 1986

[54] FILTER BRUSH

[76] Inventor: Kostas S. Arvanitakis, 14945 S. Dogwood Ave., Orland Park, Ill. 60462

[21] Appl. No.: 755,440

[22] Filed: Jul. 15, 1985

[51] Int. Cl.⁴ .............................................. B01D 25/32
[52] U.S. Cl. .................................. 210/334; 15/21 B; 55/296
[58] Field of Search ....................... 210/408, 332, 334; 55/296; 15/21 B

[56] References Cited

U.S. PATENT DOCUMENTS 2,183,368 12/1939 Meyer ................................. 210/334
3,371,791 3/1968 Schryver .
3,985,656 10/1976 Arvanitakis .

*Primary Examiner*—Bernard Nozick
*Attorney, Agent, or Firm*—August E. Roehrig, Jr.

[57] ABSTRACT

There is provided a filter brush for applying a substantially constant biasing force between adjacent filter elements and including a spring biasing system positioned between adjacent filter brush portions to exert an outward force on the brush bristles in a direction perpendicular to the face of the filter elements to maintain a substantially constant biasing force between the filter brush and an adjacent filter element.

15 Claims, 7 Drawing Figures

FILTER BRUSH

BACKGROUND OF THE INVENTION

This invention relates in general to cleaning liquids/solids separation apparatus and, in particular, to an apparatus for cleaning materials from a filter element or filter septum. More specifically, but without restriction to the particular embodiments and/or use which is shown and described for purposes of illustration, this invention relates to a wear-compensating brush assembly for applying a predetermined force to the face of a filter element or a filter septum, to mechanically scrub the face of the filter element to remove expended filter cake and/or sludge.

As is known to those skilled in the art, various types of liquid/solid separation systems have been developed for separating solid particles from a liquid. Such systems may employ mechanical screening devices which are utilized to support a chemically adsorptive/absorptive material for separating the solids and liquid by passing the liquid through the filter element and retaining the solids materials thereon and therein. As solids materials are removed from the liquid during the separation or clarification process, these solids materials accumulate on the filter element inhibiting the continued flow of the liquid therethrough. Therefore, the clarification process must be periodically stopped and the filter material, or cake, which is formed on the filter element must be removed to enable the process to continue efficiently.

The removal of the filter material or cake from the supporting screen, or filter septum, may be done by various cleaning devices such as brushes, scrapers, or sprayers, or by methods such as vibrating, backwashing or centrifuging the elements, or a combination of such devices and methods. While some of these devices and methods may be suitable for certain purposes, they may be unsuitable for other applications causing the supporting screen or filter septum of the filter element to be damaged.

In an attempt to overcome the deficiencies of such prior art cleaning devices and methods, the present inventor developed a brush for removing filter cake and sludge from the filter septum or screen of a filter element which is the subject matter of U.S. Pat. No. 3,985,656 FILTER CLEANING APPARATUS issued on Oct. 12, 1976. This patent discloses a brush which has an arm portion mounted at an angle relative to the radii extending from the central axis of the filter element. The brush includes a plurality of flexible bristles mounted on an arm portion to form a brush for engaging the surface of the filter elements as these elements are rotated relative to the arm portion. The arm portion extends across a portion of the surface of the filter element in a particular manner such that in use materials are removed from the filter element and conveyed outwardly from the filter septum to facilitate disposal. The present invention is an improvement over such a system.

In cleaning expended filter cake from the septum of a filter element by brushing, when the brush acts against the filter cake or filter septum the abrasion which occurs results in a wearing away of the brush bristles or fibers. In many applications this wearing away occurs very slowly and is not sufficient to interfere with the liquids/solids separation process. In those applications the brush elements may be replaced during periodic maintenance of the entire equipment and, therefore, there is no loss in the efficiency or productivity of the entire system.

In applications, however, wherein the liquid material is highly viscous or gelatinous, in order to thoroughly clean the filter septum, or to remove the filter cake from the filter septum, the brush must apply a significant loading force against the filter element. In those applications the brush fibers are preferably formed from metal and the abrasion between the brush bristles and the filter element is such that a significant amount of bristle wear occurs. This high wear rate interferes with the productivity of the liquid/solids separation equipment by requiring that the clarification cycle be interrupted to permit replacement of the brush elements at intervals more frequent than periodic maintenance of the system. Therefore, it is highly desirable to provide a system wherein the useful life of the brushing elements can be increased without harming the filter elements, or interfering with the productivity of the liquids/solids separation system.

SUMMARY OF THE INVENTION

It is, therefore, an object of this invention to improve the removal of filter cake from and cleaning of the septum of a filter element.

It is another object of the invention to increase the useful life of a filter brush used for removing filter cake and cleaning the filter septum of a filter element.

It is a further object of this invention to maintain a predetermined substantially constant biasing force between a filter brush and a filter septum as the bristles of the filter brush are depleted due to abrasion between the brush bristles and the filter element.

These and other objects are attained in accordance with the present invention wherein there is provided a filter brush for applying a substantially constant biasing force between adjacent filter elements and including a spring biasing system positioned between adjacent filter brush portions to exert an outward force on the brush bristles in a direction perpendicular to the face of the filter elements to maintain a substantially constant biasing force between the filter brush and an adjacent filter element.

DESCRIPTION OF THE DRAWINGS

Further objects of the invention together with additional features contributing thereto and advantages accruing therefrom will be apparent from the following description of preferred embodiments of the invention which are shown in the accompanying drawings with like reference numerals indicating corresponding parts throughout, wherein.

DESCRIPTION OF THE PREFERRED EMBODIMENTS

Figure 1:
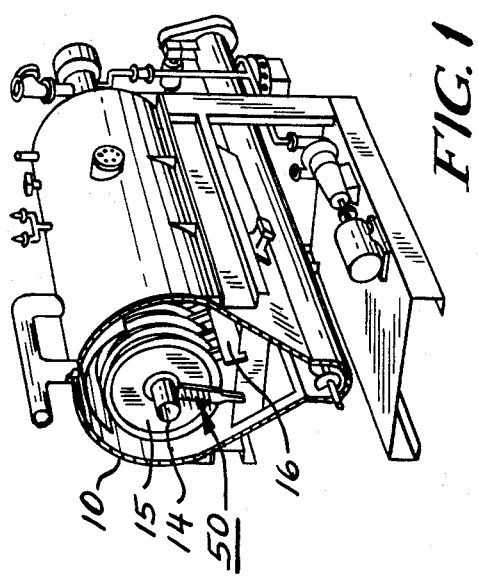
FIG. 1 is a frontal perspective view of a portion of a liquid/solid separation apparatus utilizing vertically disposed filter elements with portions of the apparatus removed to show the internal structure of the filter chamber, and one embodiment of the brush system used to remove expended filter cake and clean the filter septum of the filter element.
Figure 2:
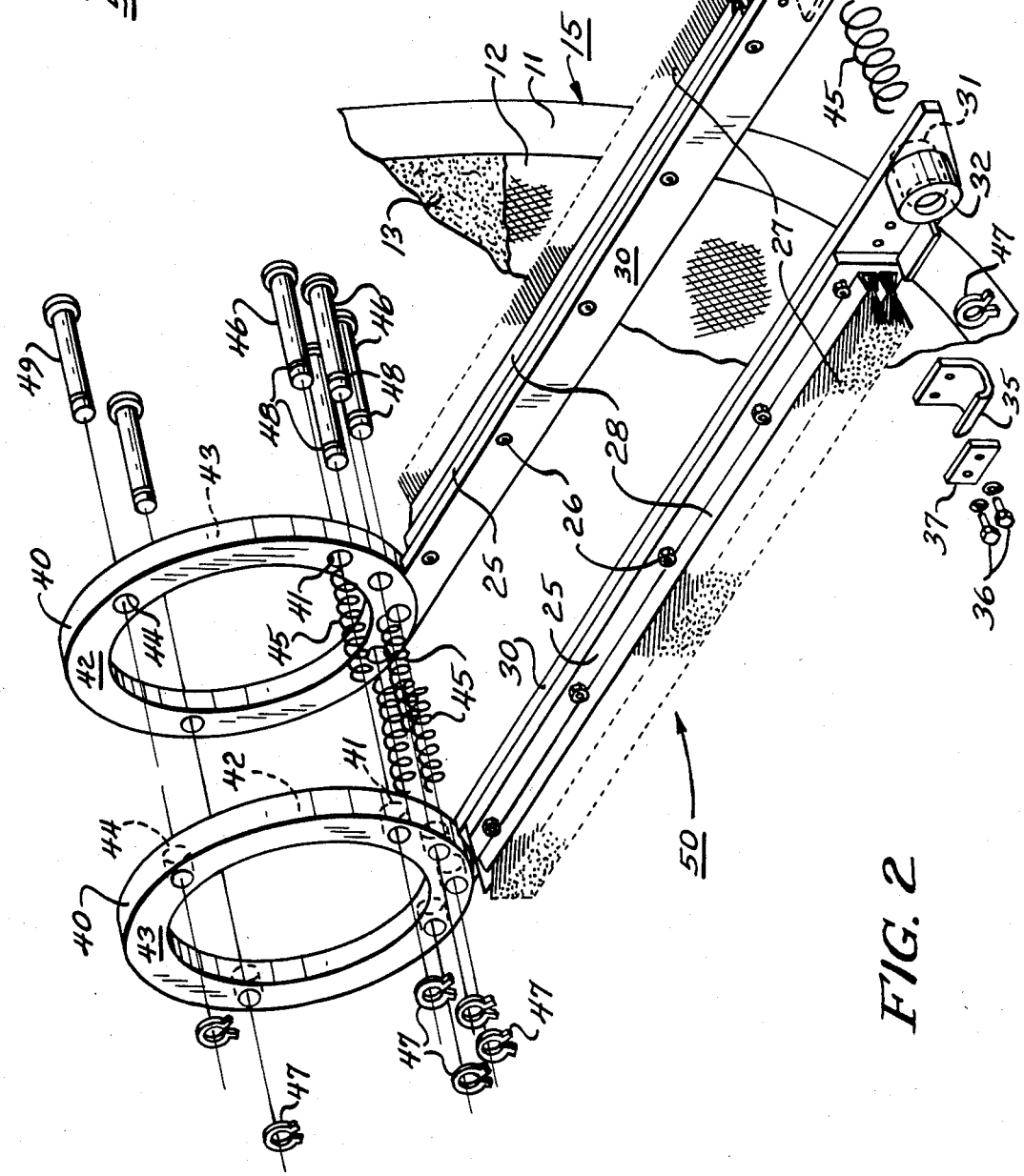
FIG. 2 is an enlarged exploded perspective view of the filter cake removal and filter septum cleaning apparatus shown in FIG. 1 to better illustrate the components thereof.
Figure 3:
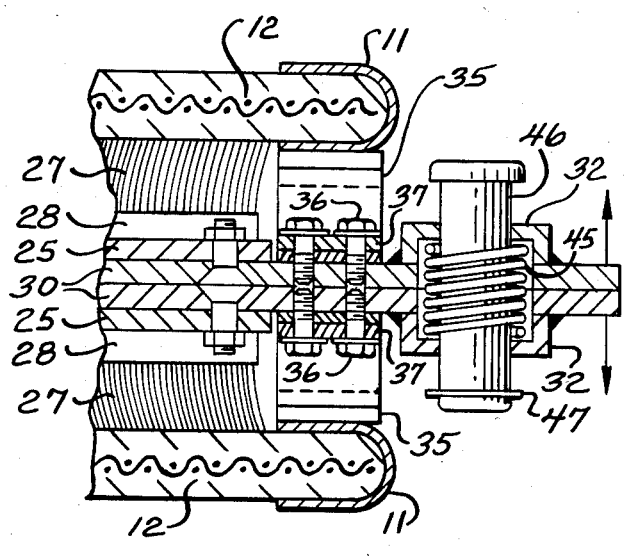
FIG. 3 is an enlarged sectional view of an end portion of the brush apparatus illustrated in FIG. 2 shown in an assembled state and positioned between two adjacent filter elements.

Referring now the embodiment of the invention illustrated in FIGS. 1 through 3, there is shown in FIG. 1 a portion of a liquid/solid separation apparatus including a filter chamber 10 into which a quantity of unclarified liquid is pumped to be clarified by being passed through one filter element 15 of a plurality of filter elements. The filter elements 15 are vertically mounted on a filter tube 14 through which clarified liquid is discharged after passing through a filter cake 13 formed on the septum 12 or fine mesh screen supported by a suitable support structure and formed of a mesh size sufficient to support the formation of a filter cake thereon. As is known to those skilled in the art, the particular mesh size of the filter cloth or fine mesh screen septum will be dependent upon the particle size of the filter aid used and the particle size of the suspended contaminants. The outer periphery of each of the filter elements 15 has a metal rim 11 fixed thereon that slightly overlaps the screen or septum and seals the outer periphery of each filter element 15.

A plurality of brushes assemblies 50 are supported by the filter tube 14 anc carried thereon such that a brush assembly 50 is positioned between each of the filter elements 15 to remove the expended filter cake from the filter septum, and to clean the filter septum in preparation for the formation of a new filter cake thereon. The filter brush 50, best shown in FIGS. 2 and 3, includes a pair of brush arms 30 each of which has removably secured thereto a brush backing bar 25. The brush backing bar 25 is secured to the brush arm 30 by a suitable nut and bolt assembly 26 and carries thereupon a plurality of brush bristles or fibers 27 secured by and in a pair of brush channels 28. In this manner, as the brush fibers 27 are depleted through abrasion during use, the entire brush cleaning assembly 30 does not have to be removed. The brush backing bar/brush channel construction permits the replacement of that portion of the assembly removably secured to the brush arm 30, rather than replacing the entire assembly.

The brush arms 30 are each supported from a spacer ring 40 which are concentrically positioned contiguous to each other about the filter tube 14 with the brush arm 30 of each extending outwardly therefrom to be engaged by a stop 16 appropriately secured to the internal walls of the filter chamber 10. The stop 16 prevents the brush cleaning assembly 50 from revolving when the filter elements 15 are rotated. In this manner, the stationary brush cleaning assembly 50 mechanically scrubs the entire surface of the filter elements 15 to remove the expended filter cake and scrub the filter septum.

Each spacer ring 40 also functions as a spring housing and to this end each is formed with a plurality of countersunk openings 41 therein. The openings 41 on adjacent faces 42 of the spacer rings are formed of a size to receive and retain a constant force compression spring 45, of about 200 pounds. The ends of each being received in adjacent openings of the adjacent faces. The opening passing through the opposite faces 43 of the spacer rings 40 is of a lesser size sufficient to block the passage of the compression spring 45, but to permit the passage of retainer pins 46 which pass through the pair of spacer rings 40 to join the two portions of the brush assembly and to support the compression springs 45 and prevent the springs from buckling. The retainer pins 46 extend a length to define the maximum separation to which the compression springs 45 are permitted to separate the adjacent brush arms 30. The retaining pins 46 pass concentrically through the compression springs 45 and secure the two portions of the brush assembly against the outwardly biasing force of springs by means of retaining rings 47 which are secured in suitable grooves 48 formed in the ends of the retaining pins. A pair of retaining pins 49 are positioned through openings 44 formed in a portion of the spacer rings 40 removed from the joinder with the brush arm 30. These pins 49 are used for alignment purposes, and these openings 44 do not receive a compression spring.

The opposite free end of each of the brush arms 30 includes an opening 31 and an outwardly extending shoulder cap 32. The opening 31 formed on the adjacent faces of the brush arm and the adjacent opening of the cap 32 are sufficient to receive a compression spring 45 which is retained within the cap portion of each brush arm. A smaller aperture 43 is formed in the outer face of each cap 32 to block passage of the spring 45. the compression spring between the two brush arms provides a biasing force pressing outwardly against each of the brush arms in a direction perpendicular to the face of the filter element 15. A retaining pin 46, of the same length as the pins 46 used with the spacer ring 40, is inserted from the outer side of one of the shoulder caps 32 and passes through the coil spring 45 retained therein between the brush arms. The pin 46 is secured in position by a retaining ring 47 engaging a suitable groove 48 formed in an end of the pin 46. This pin 46 also functions to hold the coil spring 45 in proper position between the shoulder caps 32 and prevents the spring from buckling while exerting an outward force between the two brush arms.

A wiper 35 is secured adjacent to the free end of each brush arm 30, between the end of the brush portion 27/28 and the shoulder cap 32, by bolts 36 and backing plate 37. The wiper 35 is formed of a flexible material such rubber, plastic, polyethylene or may be in the form of a brush depending upon the nature of the solids/liquids materials. The wiper 35 extends a width approximately equal to that of the closure ring or rim 11 of the filter element. In this manner, when the filter element 15 is rotated against the stationary brush assembly 50, the wiper 35 engages the closure ring 11 of the filter element to wipe therefrom any residual filter cake or other expended materials which have been loosened from the filter septum and which might accumulate on the closure ring.

Figure 4:
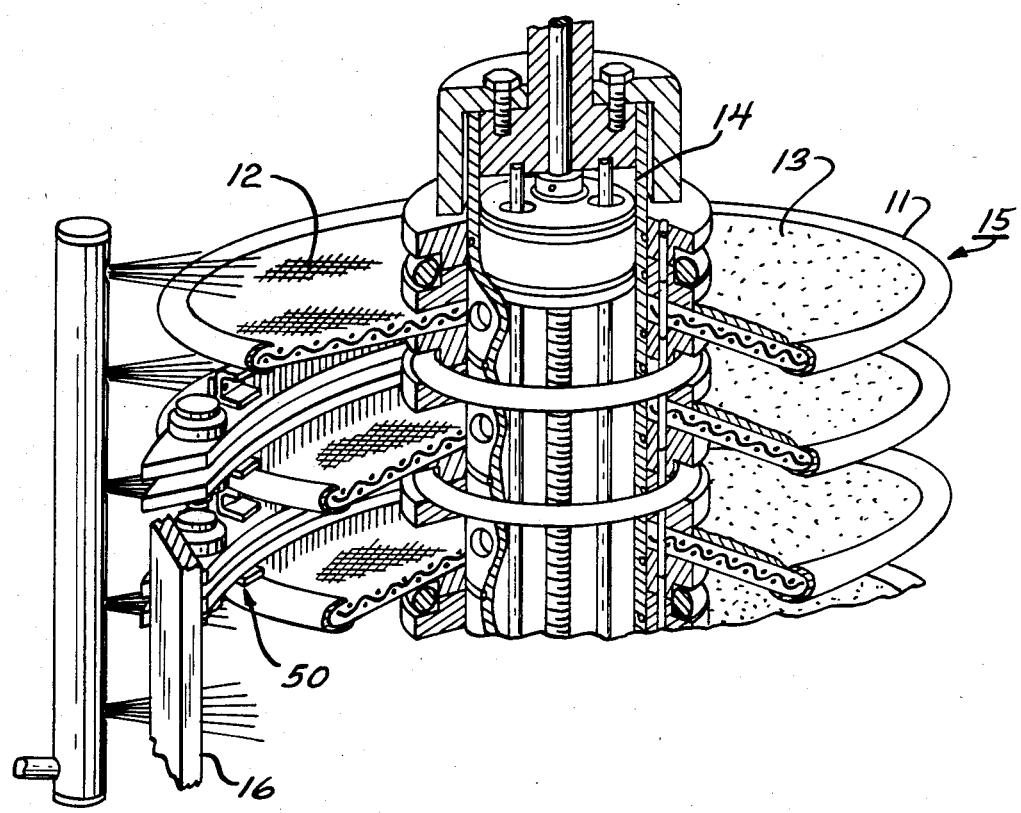
FIG. 4 is a perspective view of a portion of a liquid/solids separation system utilizing horizontally disposed filter elements with the brush cleaning system shown positioned between adjacent filter elements, with a portion of the filter elements and separation apparatus cut-away to better illustrate the internal structure thereof.
Figure 5:
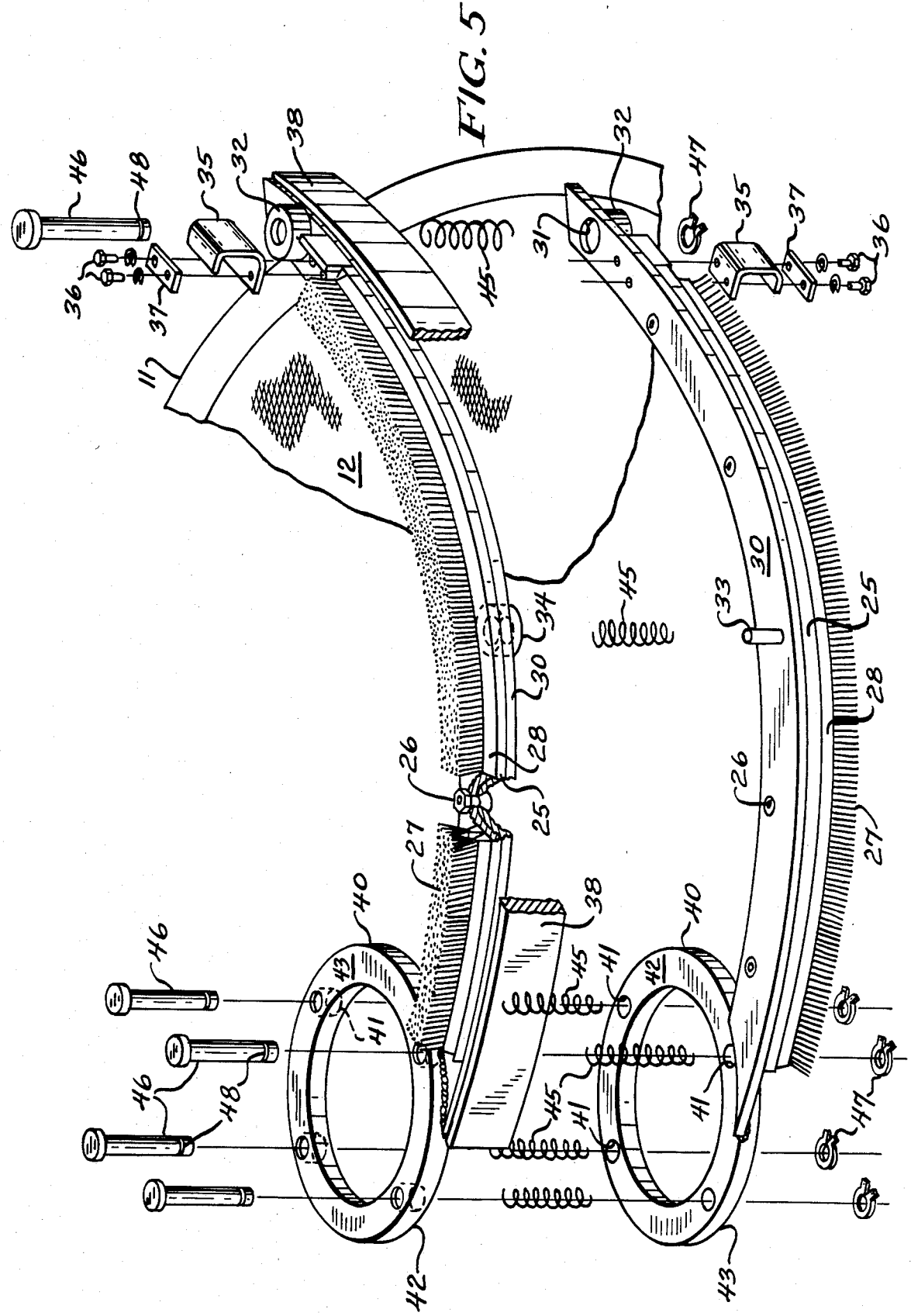
FIG. 5 is an enlarged exploded perspective view of the filter cake removed and filter septum cleaning apparatus shown in FIG. 4 to better illustrate the components thereof.

Referring now to the other embodiment of the invention as illustrated by FIGS. 4, 5 and 6, the filter element cleaning assembly is illustrated in use with a horizontal leaf filter system and in this manner the arm portion 30 is curved in the manner and for the reasons set for in the K.S. Arvanitakis, U.S. Pat. No. 3,985,656, discussed previously. In this embodiment, the brush arm 30 is constructed similar to the brush arm previously described. The terminal or free end of the brush arm includes the same compression spring assembly positioned between adjacent brush arms and each brush arm 30 includes a wiper 35 constructed and positioned in the manner previously described. However, the brush arms 30 in addition to being curved, contain a spring stud 33 secured to one of the adjacent brush arms which extends outwardly therefrom to be received in a cap or guide 34 formed in the other adjacent brush arm. The cap or guide 34 is formed with a bore of a size to receive a coiled compression spring 45, which is positioned about the spring stud 33 and within the bore of cap 34 to provide an outwardly directed force against the two brush arms 30 biasing them into engagement with the filter elements 15 positioned adjacent to the brushes 27. In addition, the spring-receiving openings or bores 41 formed in the spacer rings 40 are spaced equidistant from each other about the entire circumference of the ring. This equidistant positioning gives more uniform outward force distribution.

Figure 6B:
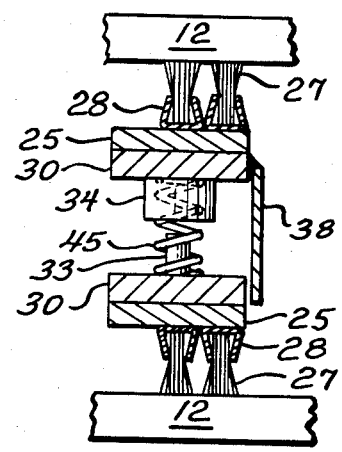
FIGS. 6A and 6B are each an enlarged end view of a brushing system as illustrated in FIG. 5 shown assembled to better illustrate the manner in which the two portions of the brush are biased outwardly in a direction perpendicular to and against the face of the filter element.
Figure 6A:
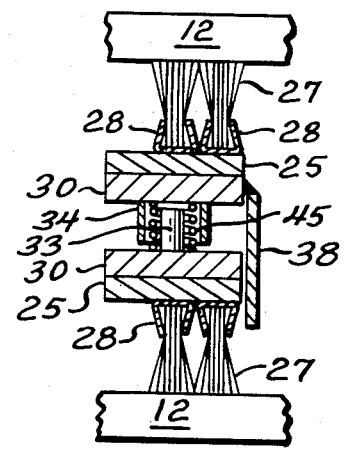

Since this embodiment is utilized to clean horizontally disposed filter elements, a shield 38 is provided to prevent materials from accumulating between adjacent brush arm portions 30 of the cleaning assembly. The shield 38 is secured to the uppermost one of the two adjacent brush arm portions, as by welding, and is formed in a length corresponding to that of the brush arm as best shown in FIG. 5. The width of the shield 38 extends sufficiently to shield the space which corresponds to the greatest separation that occurs between the two adjacent brush arms. In this manner, when the brush assembly is first installed, for example as illustrated by FIG. 6a, the compressed spring 45 exert an outward biasing force against the two adjacent brush arms 30 which is applied against the corresponding adjacent filter elements 15. The shield 38 overlaps a portion of the brush portion 27/28 of one brush arm, but does not interfere with the cleaning or scrubbing function. After periodic cyclic operation, the brush fibers or bristles 27 become depleted due to abrasion. As that occurs the force of the compression springs 45 moves the two brush arms 30 apart, as shown in FIG. 6b, increasing the vertical space therebetween while maintaining a substantially constant biasing force between the brush bristles 27 and the filter elements 15. As described previously, the maximum vertical spacial distance that can occur between the two adjacent brush arms 30 is determined by the length of the retaining pins 46. The width of the shield 38 is sized such that the shield will always cover the opening between the two brush arms 30.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

I claim:

1. A brush assembly for cleaning expended filter cake from filter elements mounted on a filter tube through which a clarified liquid is passed after having solids materials removed therefrom upon passing unclarified liquid through the filter cake supported on the septum of the filter element, and for scrubbing the filter septum after removal of the expended filter cake, the brush assembly comprising at least two parallel extending brush arms each of said brush arms having a first face positioned adjacent to each other and an opposed second face supporting brushing means for engaging a filter element, brush arm support means secured to one end of each of said brush arms and adapted to be supported from a filter tube to position said brush arms between adjacent filter elements with each of said brushing means engaging one of the adjacent filter elements, and spring biasing means supported between and engaging each one of said brush arm support means and each one of said brush arms for applying an outwardly directed separating force therebetween biasing said brushing means into engagement with an adjacent filter element with a force determined by the spring rate of said spring biasing means.

2. The brush assembly as defined as claim 1 further including wiper means positioned at a free end of each of said brush arms to engage a rim portion of an adjacent filter element for removing accumulated materials therefrom.

3. The brush assembly as defined by claim 1 wherein said brushing means are removably secured to said brush arm to facilitate replacement.

4. The brush assembly as defined by claim 1 wherein said spring biasing means are compression springs and further including retaining pins connecting said adjacent spacer rings and passing concentrically through said compression springs to define the limits of outward separating movement between adjacent brush arms.

5. The brush assembly as defined by claim 1 wherein said spring biasing means supported between and engaging each one of said brush arms includes a compression spring carried at a position adjacent to a free end of said brush arm.

6. The brush assembly as defined by claim 5 wherein said spring biasing means supported between and engaging each one of said brush arms includes a compression spring carried at a position between said brush arm support means and the compression spring carried at a position adjacent to the free end of said brush arm.

7. The brush assembly as defined by claim 5 wherein the free end of each of said brush arms includes a housing for receiving an end of said compression spring and a retaining pin passing concentrically through said housings and said compression spring to define the limits of outward separation movement between adjacent brush arms.

8. The brush assembly as defined by claim 1 wherein said brush arm support means comprises a spacer ring concentrically mounted about the filter tube.

9. The brush assembly as defined by claim 8 wherein said brush arm extend radially outward from a point tangential to said spacer ring.

10. The brush assembly as defined by claim 8 wherein said brush arm is curvilinear extending outwardly from a point tangential to said spacer ring.

11. The brush assembly as defined by claim 10 further including shield means carried by one of said brush arms for forming a barrier to exclude material from becoming lodged between said first faces thereof.

12. The brush assembly as defined by claim 8 wherein said spring biasing means are equidistantly spaced circumferentially about adjacent faces of said spacer ring.

13. The brush assembly as defined by claim 8 wherein said spring biasing means supported between and engaging each one of said brush support means are positioned on adjacent faces of said spacer ring adjacent to the point of joinder of said brush arm to said spacer ring.

14. The brush assembly as defined by claim 13 wherein said spacer ring further includes guide means carried therein at a position removed from the point of joinder of said spacer ring with said brush arm for guiding the relative separating movement between adjacent spacer rings as effected by the outwardly directed separating force of said spring biasing means.

15. The brush assembly as defined by claim 13 wherein said spring biasing means are compression springs and further including retaining pins connecting said adjacent spacer rings and passing concentrically through said compression springs to define the limits of outward separating movement between adjacent brush arms.

* * * * *

UNITED STATES PATENT AND TRADEMARK OFFICE
CERTIFICATE OF CORRECTION

PATENT NO. : 4,608,169
DATED : August 26, 1986
INVENTOR(S) : Kostas S. Arvanitakis It is certified that error appears in the above—identified patent and that said Letters Patent is hereby corrected as shown below:

Claim 2, line 33, "as" second occurrence should be --by--.

Signed and Sealed this

Thirteenth Day of January, 1987

Attest:

DONALD J. QUIGG

*Attesting Officer*  *Commissioner of Patents and Trademarks*